United States Patent
Laaksonen et al.

(10) Patent No.: US 12,243,546 B2
(45) Date of Patent: Mar. 4, 2025

(54) CONVERSATIONAL SERVICE

(71) Applicant: Nokia Technologies Oy, Espoo (FI)

(72) Inventors: Lasse Juhani Laaksonen, Tampere (FI); Miikka Tapani Vilermo, Siuro (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 18/075,843

(22) Filed: Dec. 6, 2022

(65) Prior Publication Data

US 2023/0178090 A1 Jun. 8, 2023

(30) Foreign Application Priority Data

Dec. 8, 2021 (EP) .................................. 21213065

(51) Int. Cl.
*G10L 21/0208* (2013.01)
*G10L 25/84* (2013.01)
*H04L 65/403* (2022.01)

(52) U.S. Cl.
CPC .......... *G10L 21/0208* (2013.01); *G10L 25/84* (2013.01); *H04L 65/403* (2013.01); *G10L 2021/02087* (2013.01)

(58) Field of Classification Search
CPC ........... G10K 11/178; G10K 11/17823; G10K 11/17825; G10K 11/17837; G10K 11/17881; G10L 15/20; G10L 21/02; G10L 21/0208; G10L 25/84; G10L 2021/02087; G10L 17/00; G10L 21/0232; H03G 7/007; H04L 65/403; H04L 67/141; H04M 1/6066; H04M 3/40; H04M 3/568; H04M 1/19; H04R 1/1041; H04R 1/1083; H04R 2460/01; H04R 2460/07; H04R 1/1008; H04R 3/00; H04R 25/40; H04R 25/505; G06F 3/011; G06F 3/013
See application file for complete search history.

(56) References Cited

U.S. PATENT DOCUMENTS

| | | | | |
|---|---|---|---|---|
| 7,617,094 B2 * | 11/2009 | Aoki | ....................... | G10L 17/00 704/214 |
| 7,742,746 B2 * | 6/2010 | Xiang | ................. | H04M 1/6016 381/71.7 |
| 8,213,343 B2 * | 7/2012 | Perraud | ............... | H04M 1/6066 370/278 |

(Continued)

FOREIGN PATENT DOCUMENTS

CN 113 596 670 A 11/2021

*Primary Examiner* — Gerald Gauthier
(74) *Attorney, Agent, or Firm* — McCarter & English LLP

(57) ABSTRACT

An apparatus including circuitry configured to: enable a conversational service between a first user of the apparatus and a second user of a remote apparatus wherein the conversational service is a duplex service including simultaneous voice communication from the first user to the second user and voice communication from the second user to the first user; and enable synchronization of a switch to using an active noise cancellation mode at the apparatus for the conversational service and at the remote apparatus for the conversational service, wherein the switch to using the noise cancellation mode is synchronized between the first and second users.

14 Claims, 10 Drawing Sheets

(56) References Cited

U.S. PATENT DOCUMENTS

| | | | | |
|---|---|---|---|---|
| 8,447,595 B2* | 5/2013 | Chen | | G10L 21/02 704/226 |
| 8,824,666 B2* | 9/2014 | Conte | | G10K 11/17873 379/406.02 |
| 9,082,389 B2* | 7/2015 | Nicholson | | G10K 11/17853 |
| 10,424,315 B1* | 9/2019 | Ganeshkumar | | H04R 1/1008 |
| 10,679,602 B2* | 6/2020 | Lovitt | | G10K 11/17827 |
| 10,990,171 B2* | 4/2021 | Sztuk | | G06F 3/011 |
| 11,217,268 B2* | 1/2022 | Laberge | | H04R 3/00 |
| 11,523,229 B2* | 12/2022 | Boley | | H04R 25/40 |
| 2004/0172252 A1* | 9/2004 | Aoki | | G10L 21/0208 704/270 |
| 2008/0269926 A1* | 10/2008 | Xiang | | H03G 7/007 381/94.2 |
| 2010/0226491 A1* | 9/2010 | Conte | | G10K 11/17823 379/406.01 |
| 2011/0105034 A1* | 5/2011 | Senders | | G10K 11/17825 455/63.1 |
| 2013/0259250 A1* | 10/2013 | Nicholson | | G10K 11/17881 381/71.6 |
| 2015/0304758 A1 | 10/2015 | Sorensen | | |
| 2016/0080874 A1* | 3/2016 | Fullam | | G06F 3/013 381/313 |
| 2016/0104501 A1* | 4/2016 | Weingold | | G10L 21/0208 381/71.1 |
| 2016/0198030 A1* | 7/2016 | Kim | | H04M 1/19 379/392.01 |
| 2017/0148466 A1* | 5/2017 | Jackson | | G10L 15/20 |
| 2018/0114518 A1* | 4/2018 | Scanlan | | H04R 1/1008 |
| 2018/0350381 A1* | 12/2018 | Bryan | | G10L 25/84 |
| 2019/0214036 A1* | 7/2019 | Wurtz | | G10L 21/0208 |
| 2020/0135163 A1* | 4/2020 | Lovitt | | G10K 11/17837 |
| 2020/0209957 A1 | 7/2020 | Sztuk | | |
| 2020/0286500 A1* | 9/2020 | Mukund | | G10L 21/0232 |
| 2020/0329316 A1 | 10/2020 | Boley | | |
| 2021/0037336 A1 | 2/2021 | Eronen et al. | | |
| 2021/0256954 A1* | 8/2021 | Li | | G10K 11/17873 |
| 2021/0345047 A1* | 11/2021 | Sabin | | H04R 25/505 |
| 2023/0178090 A1* | 6/2023 | Laaksonen | | H04R 1/1083 704/226 |

\* cited by examiner

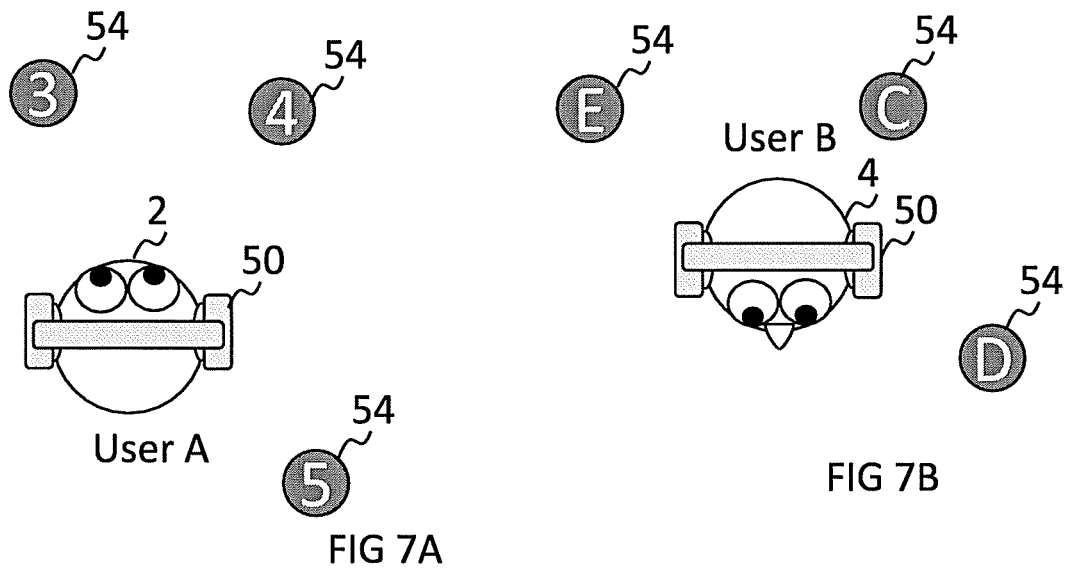
FIG 7A
FIG 7B
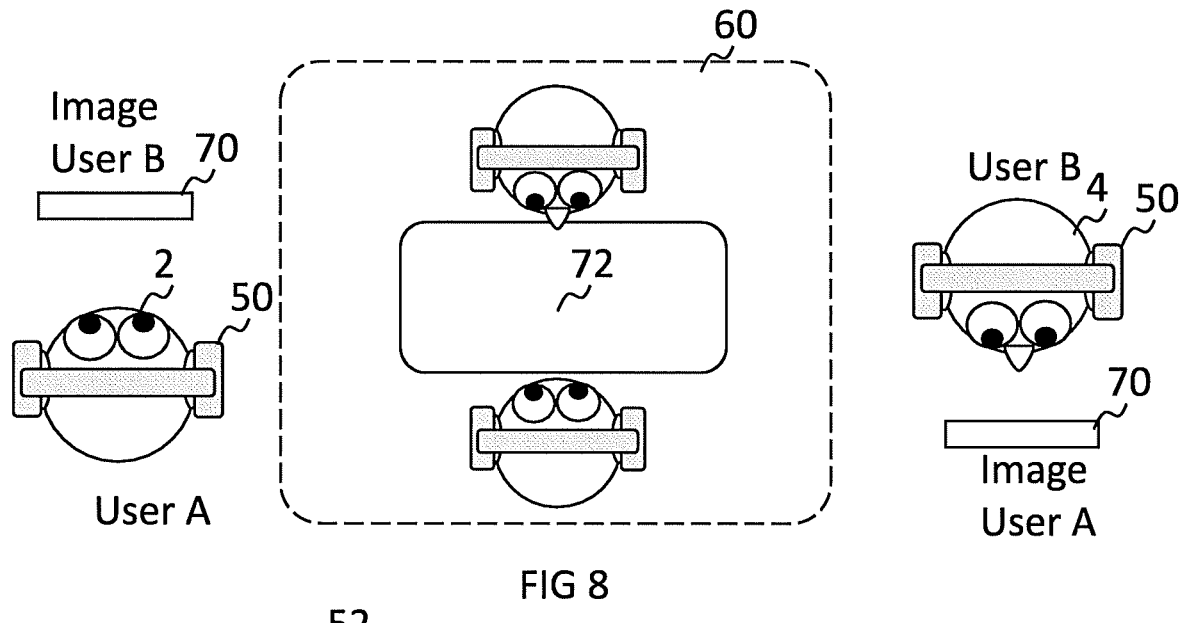
FIG 8
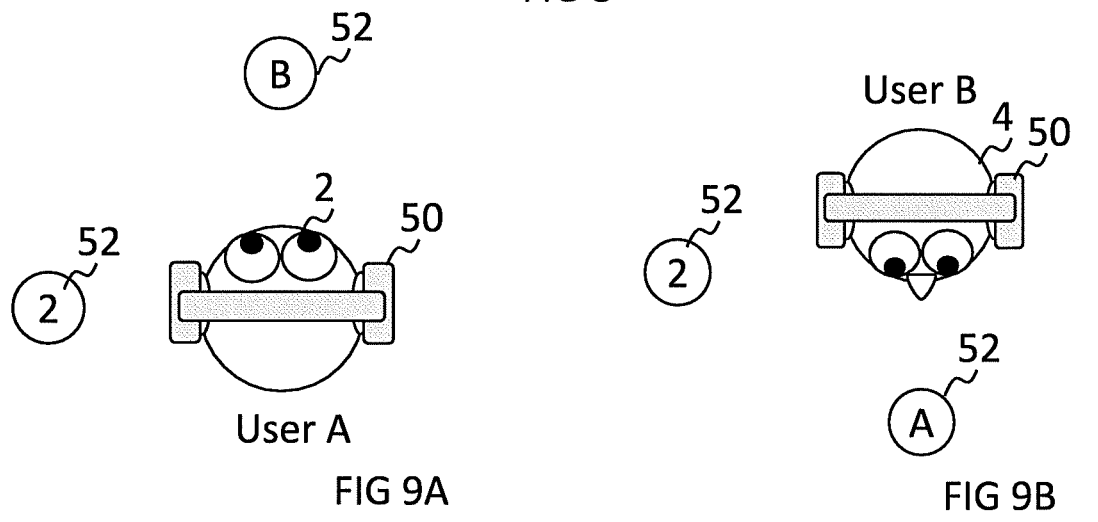
FIG 9A
FIG 9B

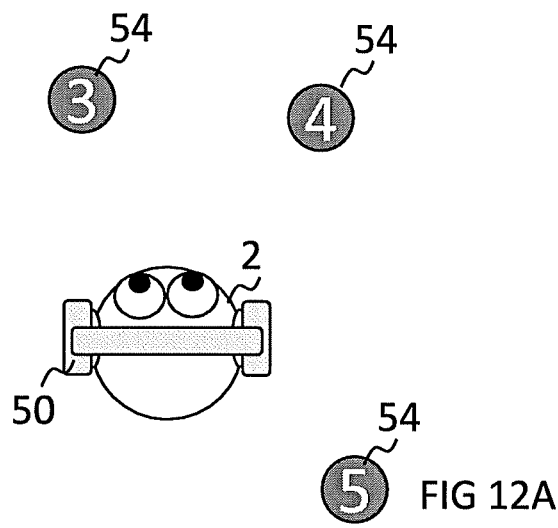 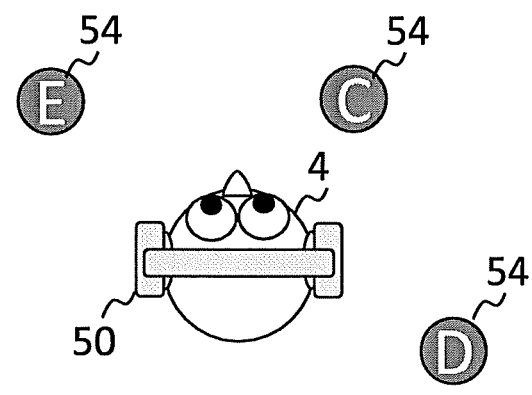
FIG 12A  FIG 12B
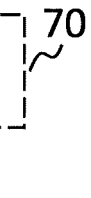
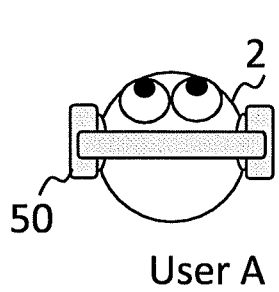
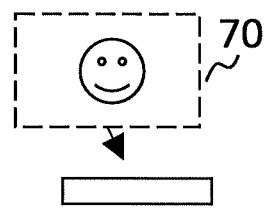
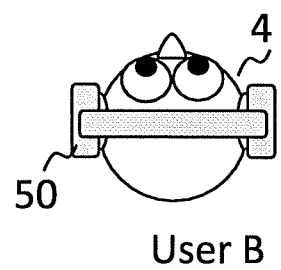
User A  User B
FIG 13A  FIG 13B
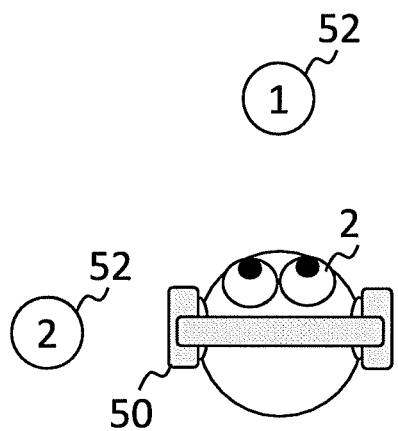 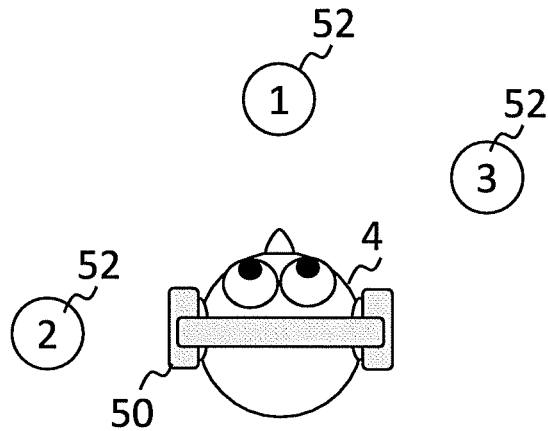
FIG 14A  FIG 14B

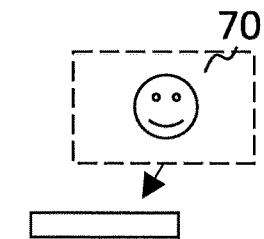
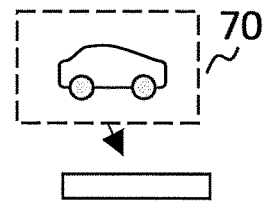
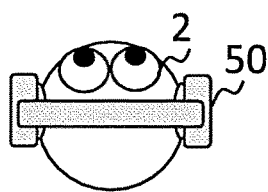
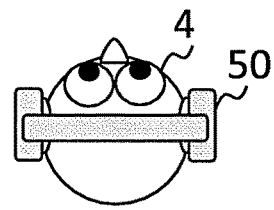
FIG 15A
FIG 15B
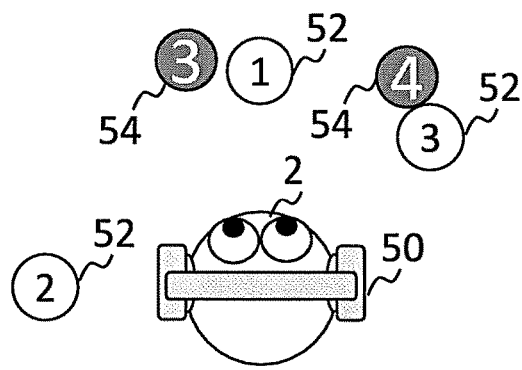
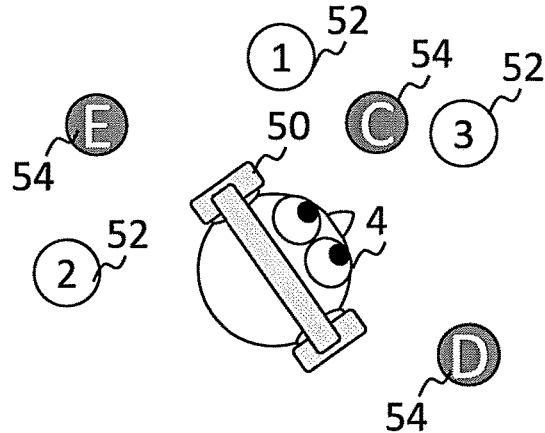
FIG 16A
FIG 16B
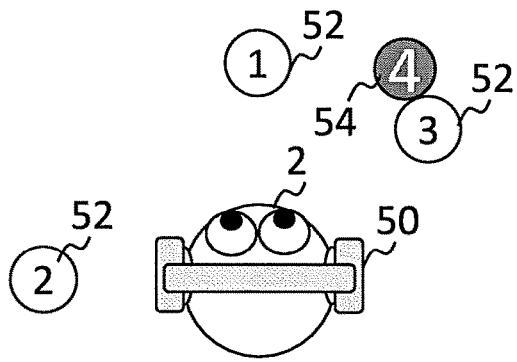
FIG 16C

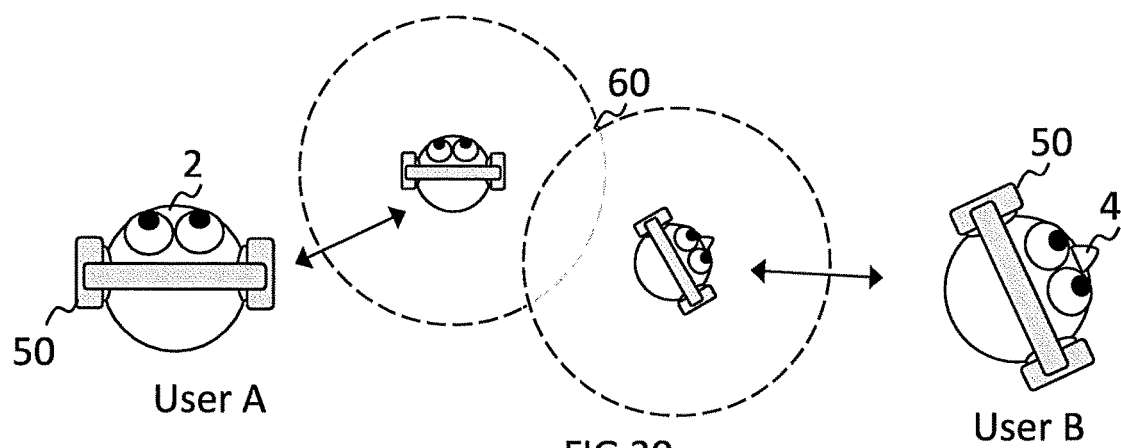
FIG 20
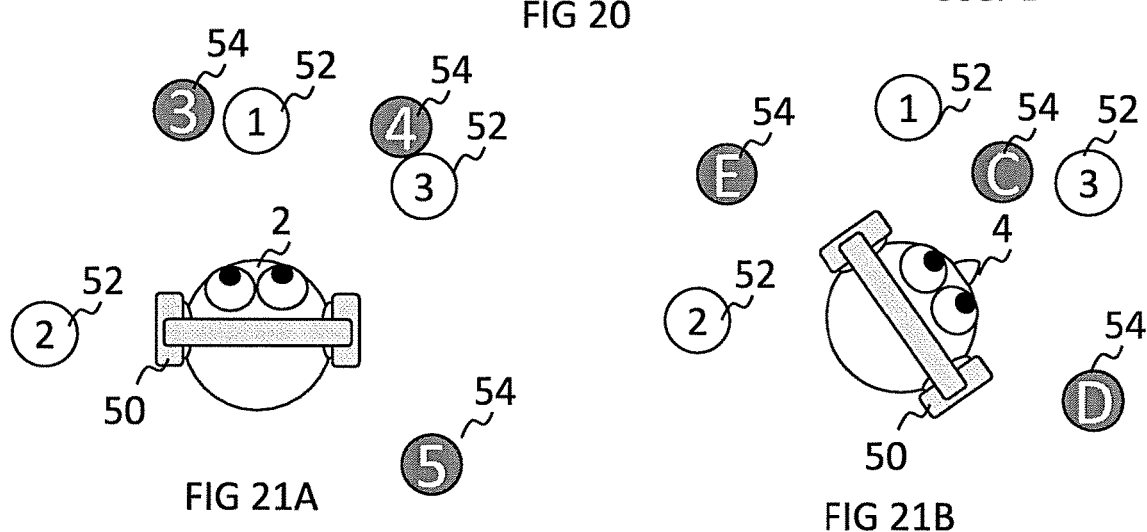
FIG 21A
FIG 21B
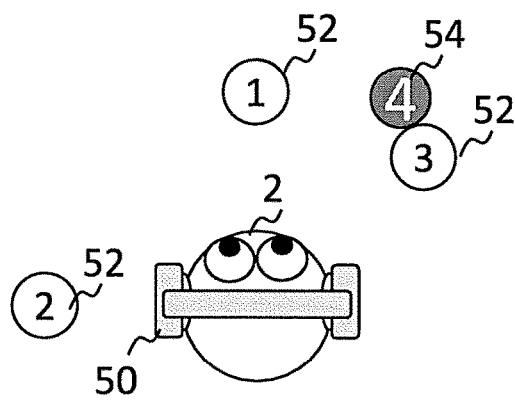
FIG 21C

CONVERSATIONAL SERVICE

TECHNOLOGICAL FIELD

Embodiments of the present disclosure relate to a conversational service

BACKGROUND

A duplex conversational service between a first user and a remote second user enables simultaneous voice communication from the first user to the second user and from the second user to the first user. Such a duplex conversational service can be used for telephone calls, teleconferences, video conferences etc.

Active noise cancellation can be used for a conversational service. Using active noise cancellation for a user means that exterior local sound to the user is canceled or mostly canceled for that user.

Active noise cancellation (also known as active noise control, noise cancellation, active noise reduction) reduces unwanted sound by adding additional sound designed to cancel the unwanted sound. In some examples, algorithms can be used to identify and invert a signal representing an unwanted sound which is then rendered as sound that cancels the unwanted sound.

BRIEF SUMMARY

According to various, but not necessarily all, embodiments there is provided an apparatus comprising means configured to:
enable a conversational service between a first user of the apparatus and a second user of a remote apparatus wherein the conversational service is a duplex service comprising simultaneous voice communication from the first user to the second user and voice communication from the second user to the first user; and
enable synchronization of a switch to using an active noise cancellation mode at the apparatus and at the remote apparatus, wherein the switch to using the active noise cancellation mode is synchronized between the first and second users.

In some but not necessarily all examples, the conversational service is a phone call, a teleconference, a videoconference, a shared multimedia experience, a shared gaming experience or a shared virtual reality experience.

In some but not necessarily all examples, the apparatus comprises means configured to enable synchronization of the switch between using a pass-through mode to using the active noise cancellation mode at the apparatus and at the remote apparatus, wherein the switch between using the pass-through mode to using the active noise cancellation mode is synchronized between the first and second users.

In some but not necessarily all examples, the apparatus is configured such that exterior local sound to the first user that is canceled for the first user in the active noise cancellation mode is not canceled for the first user in the pass-through mode.

In some but not necessarily all examples, in the pass-through mode, pass-through sound rendered to the first user depends on a point of view of the first user In some but not necessarily all examples, the apparatus is configured such that the exterior local sound to the second user that is canceled or is not provided for the first user in the active noise cancellation mode is not canceled or is provided for the first user in the pass-through mode.

In some but not necessarily all examples, in the pass-through mode, pass-through sound rendered to the first user depends on a point of view of the second user.

In some but not necessarily all examples, the apparatus comprises means configured to cause a switch to using the active noise cancellation mode at the apparatus and at the remote apparatus when the first user and the second user are focusing at a common point of interest.

In some but not necessarily all examples, the apparatus comprises means configured to cause a switch to
using the active noise cancellation mode at the apparatus and at the remote apparatus in dependence upon information about what visual content each of the first user and the second user is looking at.

In some but not necessarily all examples, the apparatus comprises means configured to increase a level of active noise cancellation at the apparatus and at the remote apparatus while a focus of a gaze of the first user and a focus of a gaze of the second user are converging and to decrease a level of active noise cancellation at the apparatus and at the remote apparatus while a focus of a gaze of the first user and a focus of a gaze of the second user are diverging.

In some but not necessarily all examples, the apparatus comprises configured to cause a switch from not using an active noise cancellation mode for the cancellation service to using an active noise cancellation mode at the apparatus and at the remote apparatus when
there is a change from the first user looking at a first object and the second user not looking at the first object to the first user looking at the first object and the second user looking at the first object
or
there is a change from the first user not looking at a first object and the second user looking at the first object to the first user looking at the first object and the second user looking at the first object.

In some but not necessarily all examples, the apparatus comprises means configured to enable synchronization of a switch from using the active noise cancellation mode at the apparatus and at the remote apparatus, wherein the switch from using the noise cancellation mode is synchronized between the first and second users.

In some but not necessarily all examples, the apparatus is configured as a headset.

According to various, but not necessarily all, embodiments there is provided a computer program that when run on one or more processors causes:
enabling a conversational service between a first user of the apparatus and a second user of a remote apparatus wherein the conversational service is a duplex service comprising simultaneous voice communication from the first user to the second user and voice communication from the second user to the first user; and
enabling synchronization of a switch to using an active noise cancellation mode at the apparatus and at the remote apparatus, wherein the switch to using the noise cancellation mode is synchronized between the first and second users.

According to various, but not necessarily all, embodiments there is provided a method comprising:
enabling a conversational service between a first user of the apparatus and a second user of a remote apparatus wherein the conversational service is a duplex service comprising simultaneous voice communication from the first user to the second user and voice communication from the second user to the first user; and enabling synchronization of a switch to using an active noise cancellation mode at the apparatus and at the remote apparatus, wherein the switch to using the noise cancellation mode is synchronized between the first and second users.

According to various, but not necessarily all, embodiments there is provided examples pnas claimed in the appended claims.

BRIEF DESCRIPTION

Some examples will now be described with reference to the accompanying drawings in which.

Figure 22:
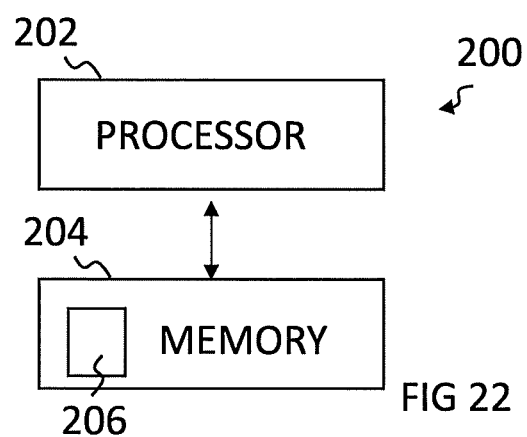
Figure 23:
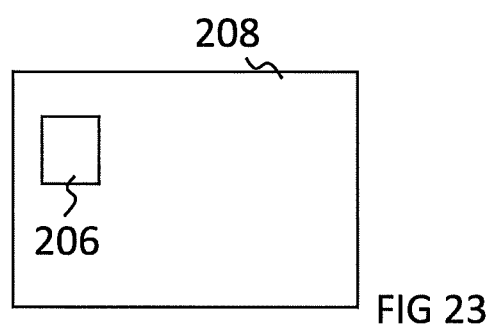

FIGS. 7A, 7B, 8, 9A, 9B relate to active noise cancellation and FIGS. 10, 11A, 11B, 11C, 11D, 11E relate to pass-through;

FIGS. 12A, 12B, 13A, 13B, 14A, 14B relate to active noise cancellation and FIGS. 15A, 15B, 16A, 16B, 16C relate to pass-through;

FIGS. 17A, 17B, 18, 19A, 19B relate to active noise cancellation and FIGS. 20, 21A, 21B, 21C relate to pass-through;

FIG. 22 illustrates an example of a controller;

FIG. 23 illustrates an example of a computer program.

DETAILED DESCRIPTION

Figure 1:
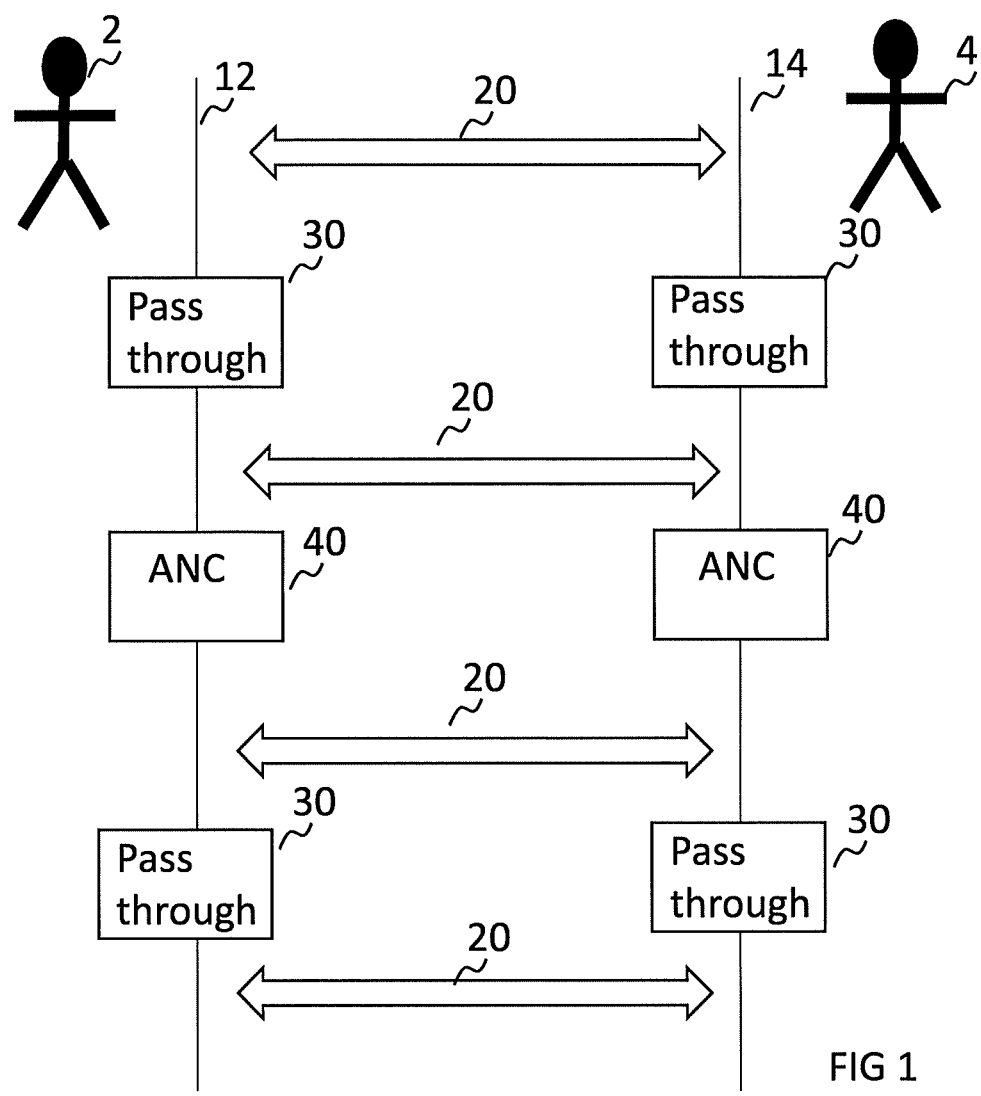
FIG. 1 illustrates a conversational service between two users that use, intermittently, active noise cancellation.

FIG. 1 illustrates an example of an apparatus comprising means configured to enable a conversational service 20 between a first user of the apparatus and a second user of a remote apparatus wherein the conversational service 20 is a duplex service comprising simultaneous voice communication from the first user to the second user and from the second user to the first user; and enable synchronization of a switch to using an active noise cancellation mode 40 at the apparatus for the conversational service 20 and at the remote apparatus for the conversational service 20, wherein the switch to using the active noise cancellation mode 40 is synchronized between the first and second users.

The apparatus is also configured to enable synchronization of a switch from using the active noise cancellation mode 40 at the apparatus for the conversational service 20 and at the remote apparatus for the conversational service 20, wherein the switch from using the active noise cancellation mode 40 is synchronized between the first and second users.

The FIG. 1 illustrates two apparatus and two respective users. The first apparatus 12 can be the apparatus (the first user being the user 2) and the second apparatus 14 can be the remote apparatus (the second user being the user 4), or vice versa.

Using an active noise cancellation mode 40 at the first apparatus 12 means that exterior local sound to the first user 2 is canceled or mostly canceled for the first user 2.

Using an active noise cancellation mode 40 at the second apparatus 14 means that exterior local sound to the second user 4 is canceled or mostly canceled for the second user 4.

In some but not necessarily all examples, using an active noise cancellation mode 40 at the first apparatus 12 means that exterior local sound to the second user 4 is canceled or mostly canceled for the first user 2.

In some but not necessarily all examples, using an active noise cancellation mode 40 at the second apparatus 14 means that exterior local sound to the first user 2 is canceled or mostly canceled for the second user 4.

The first apparatus 12 and the second apparatus 14 are configured to enable a conversational service 20 between a first user 2 of the first apparatus 12 and a second user 4 of a second apparatus 14. The first and second apparatuses 12, 14 are remote from each other as are the first and second users 2, 4.

The conversational service 20 is a duplex service comprising simultaneous voice communication from the first user 2 to the second user 4 and from the second user 4 to the first user 2.

The first and second apparatus 12, 14 are configured to use an active noise cancellation mode 40 at the respective apparatus 12, 14 for the conversational service 20.

The first and second apparatus 12, 14 are also configured to use a pass-through mode 30 at the respective apparatus 12, 14 for the conversational service 20.

Using a pass-through mode 30 at the first apparatus 12 means that exterior local sound to the first user 2 is not canceled or not mostly canceled for the first user 2. That is the exterior local sound to the first user 2 is not canceled or the exterior local sound to the first user 2 is not mostly canceled for the first user 2.

Using a pass-through mode 30 at the second apparatus 14 means that exterior local sound to the second user 4 is not canceled or not mostly canceled for the second user 4. That is the exterior local sound to the second user 4 is not canceled or the exterior local sound to the second user 4 is not mostly canceled for the second user 4.

The first and second apparatus 12, 14 are configured to enable synchronization of switching to or from using the active noise cancellation mode 40 for the conversational service 20.

The users 2, 4 of the apparatus 12, 14 experience the simultaneity of the switch.

The first apparatus 12 is configured to enable synchronization of a switch to using the active noise cancellation mode 40 at the first apparatus 12 for the conversational service 20 and at the second apparatus 14 for the conversational service 20, wherein the switch from using the active noise cancellation mode 40 is synchronized between the first user 2 and the second user 4.

The second apparatus 14 is configured to enable synchronization of a switch to using the active noise cancellation mode 40 at the second apparatus 14 for the conversational service 20 and at the first apparatus 12 for the conversational service 20, wherein the switch from using the active noise cancellation mode 40 is synchronized between the first user 2 and the second user 4.

As illustrated in FIG. 1, the first apparatus 12 is configured to enable synchronization of a switch to using the active noise cancellation mode 40, from using the pass-through mode 30, for the conversational service 20 at the first apparatus 12 and at the second apparatus 14. The switch is synchronized between the first user 2 and the second user 4. The first apparatus 12 is also configured to enable synchronization of a switch from using the active noise cancellation mode 40, to using the pass-through mode 30, for the conversational service 20 at the first apparatus 12 and at the second apparatus 14. The switch is synchronized between the first user 2 and the second user 4.

As illustrated in FIG. 1, the second apparatus 14 is configured to enable synchronization of a switch to using the active noise cancellation mode 40, from using the pass-through mode 30, for the conversational service 20 at the second apparatus 14 and at the first apparatus 12. The switch is synchronized between the first user 2 and the second user 4. The second apparatus 14 is also configured to enable synchronization of a switch from using the active noise cancellation mode 40, to using the pass-through mode 30, for the conversational service 20 at the second apparatus 14 and at the first apparatus 12. The switch is synchronized between the first user 2 and the second user 4.

In some examples, during the pass-through mode 30 of the conversational service 20, real pass-through occurs at the first apparatus 12. Exterior sound sources that are local to the first user 2 and that are canceled for the first user 2 in the active noise cancellation mode 40 are not canceled for the first user 2 in the pass-through mode 30.

In some examples, during the pass-through mode 30 of the conversational service 20, real pass-through occurs at the second apparatus 14. Exterior sound sources that are local to the second user 4 and that are canceled for the second user 4 in the active noise cancellation mode 40 are not canceled for the second user 4 in the pass-through mode 30.

In some examples, during the pass-through mode 30 of the conversational service 20, real pass-through occurs at the first apparatus 12 and at the second apparatus 14.

In some examples, during the pass-through mode 30 of the conversational service 20, virtual pass-through occurs at the first apparatus 12. Exterior sound sources that are local to the second user 4 and that are canceled for the first user 2 in the active noise cancellation mode 40 are not canceled for the first user 2 in the pass-through mode 30.

In some examples, during the pass-through mode 30 of the conversational service 20, virtual pass-through occurs at the second apparatus 14. Exterior sound sources that are local to the first user 2 and that are canceled for the second user 4 in the active noise cancellation mode 40 are not canceled for the second user 4 in the pass-through mode 30.

In some examples, during the pass-through mode 30 of the conversational service 20, virtual pass-through occurs at the first apparatus 12 and at the second apparatus 14.

Figure 2:
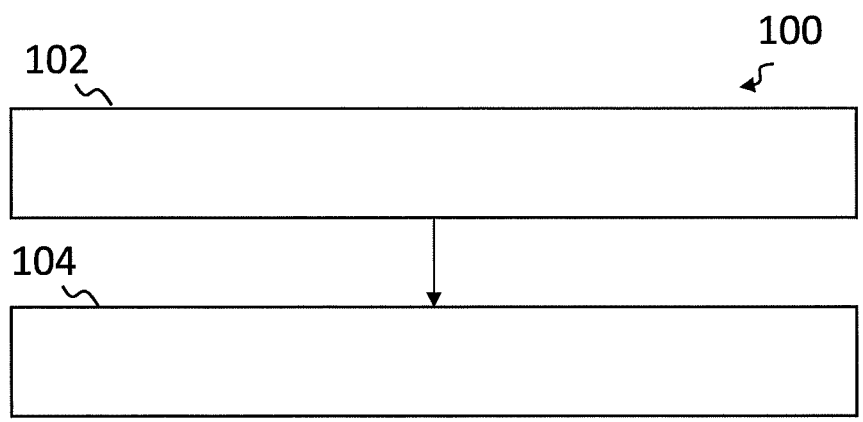
FIG. 2 illustrates a illustrates method relating to a conversational service between two users that uses, intermittently, active noise cancellation.

FIG. 2 illustrates an example of a method 100. The method 100 can for example be performed at the first apparatus 12 or the second apparatus 14. The method is for controlling active noise cancellation while providing a conversational service.

According to one example, at block 102, the method 100 comprises enabling a conversational service 20 between a first user 2 of a first apparatus 12 and a second user 4 of a second apparatus 14 wherein the conversational service 20 is a duplex service comprising simultaneous voice communication from the first user 2 to the second user 4 and from the second user 4 to the first user 2.

At block 104, the method 100 comprises enabling synchronization of a switch to using an active noise cancellation mode 40 for the conversational service 20 at the first apparatus 12 and at the second apparatus 14. The switch to using the active noise cancellation mode 40 is synchronized between the first user 2 and the second user 4.

The conversational service 20 can be provided to the first user 2 via a headset 50 and/or provided to the second user 4 via a headset 50. Spatial audio, for example binaural coding, allows a sound source 52 to be positioned relative to a user.

Figure 3A:
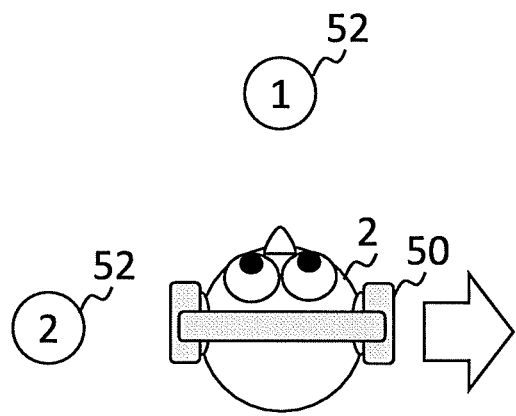
FIGS. 3A, 3B, 4A, 4B, 5A, 5B and 6A, 6B illustrate the effect of active noise cancellation and also the effect of head-tracking.
Figure 3B:
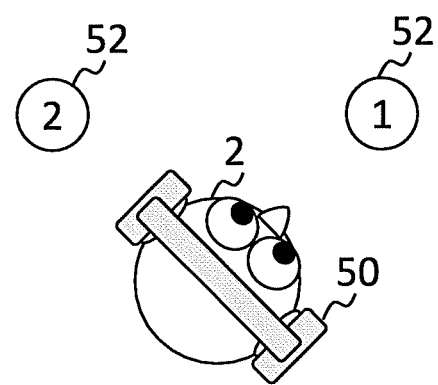
Figure 4A:
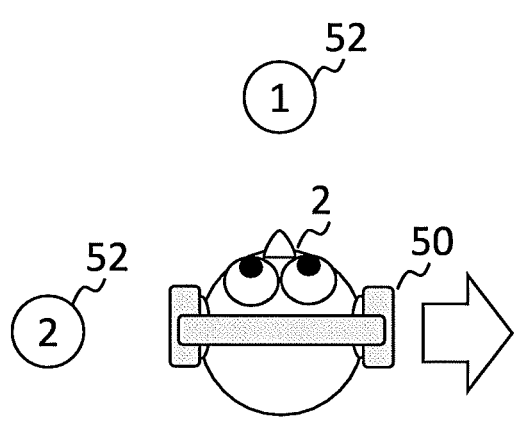
Figure 4B:
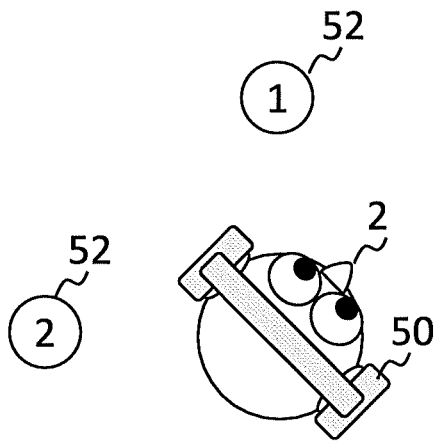

FIG. 3A and FIG. 3B illustrate an example in which sound source(s) 52 are rendered to a first user 2 via a headset 50 using active noise cancellation with no head-tracking. FIG. 4A and FIG. 4B illustrate an example in which sound source(s) 52 are rendered to a first user 2 via a headset 50 using active noise cancellation with head-tracking. The exterior sound source(s) that are canceled during active noise cancellation mode 40 are not illustrated.

Figures 5A, 5B:
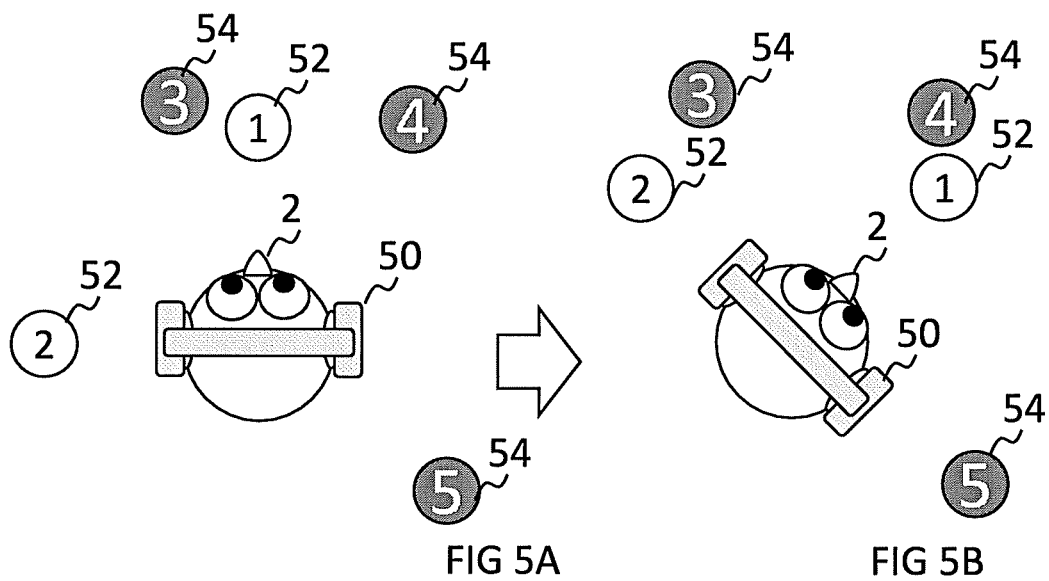
Figures 6A, 6B:
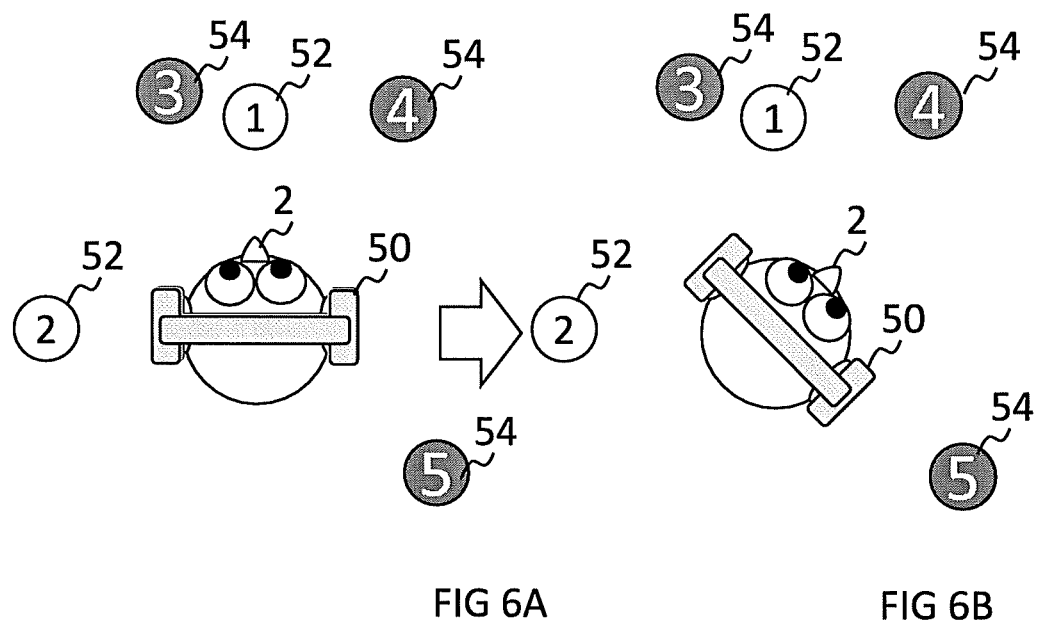

FIG. 5A and FIG. 5B illustrate an example in which sound source(s) 52 are rendered to a first user 2 via a headset 50 using pass-through (no active noise cancellation) with no head-tracking. FIG. 6A and FIG. 6B illustrate an example in which sound source(s) 52 are rendered to a first user 2 via a headset 50 using pass-through (no active noise cancellation) with head-tracking. The exterior sound source(s) 54 that are not canceled during pass-through mode 30 are illustrated.

In these examples, the headset 50 can be the first apparatus 12 or be in communication with the first apparatus 12. In other examples, the headset 50 can be the second apparatus 14 or be in communication with the second apparatus 14.

In the examples where head-tracking is performed, the point of view of the first user 2 is tracked. The point of view of the user can be defined using orientation only or can be defined using orientation and location. Orientation can be defined in two or three dimensions. Location can be defined in two or three dimensions.

Referring to FIGS. 3A and 3B, the first user 2 changes one point of view (FIG. 3A) to a new, different point of view (FIG. 3B). There is no head-tracking and the rendered sound sources 52 move with the head of the first user 2. The sound sources 52 are rendered at a fixed position relative to the headset 50 and move with movement of the headset 50. The first user 2 cannot change the audio focus and look towards or away from a particular rendered sound source 52.

Referring to FIGS. 4A and 4B, the first user 2 changes one point of view (FIG. 4A) to a new, different point of view (FIG. 4B). There is head-tracking and the rendered sound sources 52 appear to the first user 2 to be fixed in a space through which the first user 2 moves. The sound sources 52 are rendered at a fixed real-world position and do not move relative to the first user 2 with movement of the headset 50. The rendered sound source(s) 52 are moved relative to the headset 50 in a direction opposite to movement of the headset 50 in the real-world. The first user 2 can change the audio focus and look towards or away from a particular rendered sound source 52.

Referring to FIGS. 5A and 5B, the first user 2 changes one point of view (FIG. 5A) to a new, different point of view (FIG. 5B). There is no head-tracking and there is no active noise cancellation. The rendered sound sources 52 move with the head of the first user 2. The sound sources 52 are rendered at a fixed position relative to the headset 50 and move with movement of the headset 50 relative to the exterior sound sources 54 that are fixed in real-space. The first user 2 cannot change the audio focus and look towards or away from a particular rendered sound source 52 but can look towards or away from the exterior sound sources 54.

Referring to FIGS. 6A and 6B, the first user 2 changes one point of view (FIG. 6A) to a new, different point of view (FIG. 6B). There is head-tracking and the rendered sound sources 52 appear to the first user 2 to be fixed in a space through which the first user 2 moves. The sound sources 52 are rendered at a fixed position relative to the exterior sound sources 54 that are fixed in real-space. The sound sources 52 are rendered at a fixed real-world position and do not move relative to the first user 2 with movement of the headset 50. The rendered sound sources 52 are moved relative to the headset 50 in a direction opposite to movement of the headset 50 in the real-world. The user can change the audio focus and look towards or away from a particular rendered sound source 52 and can look towards or away from exterior sound sources 54.

The examples described above with reference to FIGS. 1 and 2 can be performed either with or without head tracking. FIGS. 3A, 3B and 5A, 5B illustrate respectively an active noise cancellation mode (FIGS. 3A, 3B) and a pass-through mode (FIGS. 5A, 5B), where there is no head tracking. FIGS. 4A, 4B and 6A, 6B illustrate respectively an active noise cancellation mode (FIGS. 4A, 4B) and a pass-through mode (FIGS. 6A, 6B), where there is head tracking. In these examples, the exterior sound sources 54 present during pass-through mode 30 are absent during active noise cancellation mode 40.

Head-tracking can be performed by measuring movement of the head or headset 50. In some examples, this is achieved using sensors that remotely monitor the first user 2. In some examples, this is achieved using sensors within the headset 50.

In real pass-through, the exterior sound sources 54 are real sound sources that are exterior to and local to the first user 2.

In virtual pass-through, the exterior sound sources 54 are virtual sound sources that are exterior to and local to the second user 4.

The sound source(s) 54 that are canceled for the first user 2 in the active noise cancellation mode 40 are not canceled for the first user 2 in the pass-through mode 30.

In pass-through mode 30 with head-tracking (FIGS. 5A, 5B) real pass-through exterior sound sources 54 can be rendered to the first user 2 in dependence upon a point of view of the first user 2. Real pass-through exterior sound sources 54 can be rendered to the second user 4 in dependence upon a point of view of the second user 4.

In pass-through mode 30, virtual pass-through exterior sound source(s) 54 can be rendered to the first user 2 in dependence upon a point of view of the second user 4. In pass-through mode 30, virtual pass-through exterior sound source(s) 54 can be rendered to the second user 4 in dependence upon a point of view of the first user 2.

In some examples, pass-through mode 30 is only implemented on one apparatus. For example, if the second user 4 changes their focus, then the active noise cancellation mode 40 can switch to a pass-through mode 30 at only the first apparatus 12 (not the second apparatus 14). If the pass-through mode 30 uses real pass-through, then the first user 2 knows that the second user 4 has changed their focus but is not informed about what they are focusing on. If the pass-through mode 30 uses virtual pass-through, then the sound source associated with what the second user 4 is now focused on, can be rendered to the first user 2.

The trigger for causing switching to/from using an active noise cancellation mode 40 for the conversational service 20 at the first apparatus 12 and/or at the second apparatus 14 can be any suitable trigger.

In some examples, the trigger is a user input command given by a user 2, 4. In other examples, the trigger is automatically generated. For example, a trigger for causing synchronization of a switch to using an active noise cancellation mode 40 for the conversational service 20 at the first apparatus 12 and at the second apparatus 14 can be that the users 2, 4 share a point of interest, for example, they are viewing common content, viewing a common object, looking towards a common point or looking together in a common direction. For example, a trigger for causing synchronization of a switch from using an active noise cancellation mode 40 for the conversational service 20 at the first apparatus 12 and/or at the second apparatus 14 can be that the users 2, 4 no longer share a point of interest.

Thus in at least some examples the first apparatus 12 is configured to cause a switch to using the active noise cancellation mode 40 for the conversational service 20 at the first apparatus 12 and at the second apparatus 14 when the first user 2 and the second user 4 are focusing at a common point of interest.

Thus, in at least some examples the first apparatus 12 is configured to cause a switch to using the active noise cancellation mode 40 for the conversational service 20 at the first apparatus 12 and at the second apparatus 14 in dependence upon information about what visual content each of the first user 2 and the second user 4 is looking at. This information is utilized to modify the audio rendering for one or both of the users 2, 4 in order to indicate the amount of common experience between the users 2, 4.

In some examples, there is feedback to a user 2,4 of the amount of common experience between the users 2, 4 and how that common experience between the users 2, 4 is changing in dependence upon actions of one or both users 2, 4. The users can thus have feedback on whether their actions are leading to convergence or divergence as regards having a shared common experience. In some examples, the first apparatus 12 is configured to increase a level of active noise cancellation in the active noise cancellation mode 40 for the conversational service 20 at the first apparatus 12 and at the second apparatus 14 while a focus of a gaze of the first user 2 and a focus of a gaze of the second user 4 are converging and to decrease a level of active noise cancellation while a focus of a gaze of the first user 2 and a focus of a gaze of the second user 4 are diverging.

In the examples describe herein, the conversational service 20 can be a phone call, a teleconference, a videoconference, a shared multimedia experience, a shared gaming experience, a shared virtual reality experience etc.

FIG. 7A illustrates a first arrangement of real exterior sound sources 54 for a first user 2 and FIG. 7B a second arrangement of real exterior sound sources 54 for a second user 4. As the users 2, 4 are remote, the real exterior sound sources 54 are different for the two users 2, 4.

FIG. 8 illustrates a virtual environment 60 of the conversational service 20. In this example the virtual environment 60 is a teleconference or a videoconference in which the first user 2 and the second user 4 are face-to-face. The first and second users 2, 4 share a common point of interest 72 between them in the virtual environment 60. In the example of a videoconference, a video image of the first user 2 is provided as visual content 70 to the second user 4 and a video image of the second user 4 is provided as visual content 70 to the first user 2.

A sound source 52 ("B") for the voice audio of the second user 4 (User B) is rendered in front of the first user 2 (FIG. 9A). A sound source 52 ("A") for the voice audio of the first user 2 (User A) is rendered in front of the second user 4 (FIG. 9B). A common sound source 52 is rendered to the left of the first user 2 (FIG. 9A) and to the right of the second user 4 (FIG. 9B).

The first and second user 2, 4 are focusing at a common point of interest 72, and this has caused a switch into active noise cancellation mode 40 (FIGS. 9A, 9B).

In some example, it can be determined that the users 2, 4 share a common point of interest from information about users' points of view which can, in some examples be determined based on location and/or orientation of the respective headsets 50 of the users 2, 4. The respective points of view can be defined by (position and) orientation of the users 2, 4. A change in relative position/orientation of the users 2, 4 can be used to indicate that the users 2,4 are no longer focusing on a common point of interest 72 and this can be used to trigger an exit from the active noise cancellation mode 40 into a pass-through mode 30.

Figure 10:
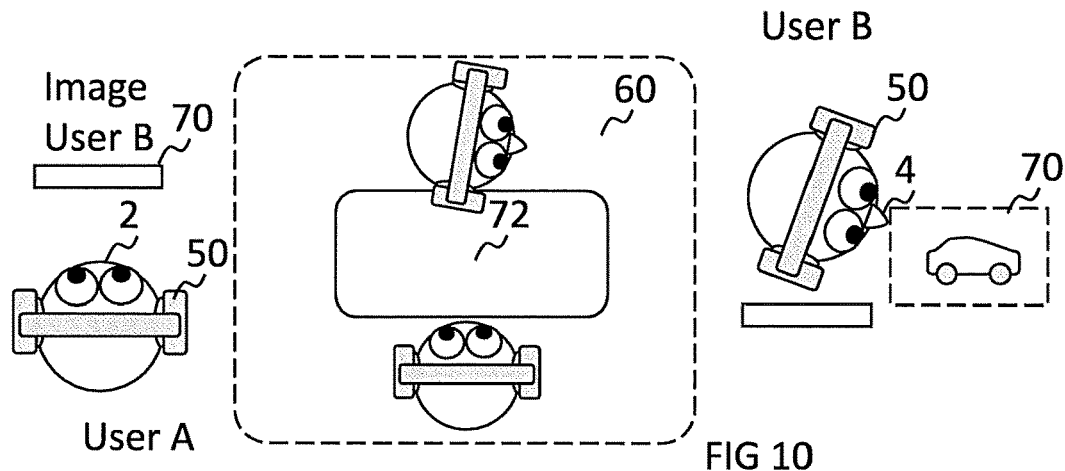

FIG. 10 illustrates the virtual environment 60 of the conversational service 20, when the second user 4 has changed a relative position/orientation, so that the second user 4 is no longer focusing on the previous common point of interest 72.

In the virtual environment 60, the first user 2 can move relative to the sound source 52 of the second user 4 and the common sound source(s) 52 and the audio rendered to the first user 2 and the second user 4 can be controlled accordingly; the second user 4 can move relative to the sound source 52 of first user 2 and the common sound source(s) 52 and the audio rendered to the first user 2 and the second user 4 can be controlled accordingly;

the common sound source(s) can move relative to the first user 2 and the second user 4 and the audio rendered to the first user 2 and the second user 4 can be controlled accordingly In this example, only the second user 4 changes their point of view by changing orientation. Consequently, the positions of the sound sources 52 remain constant in FIGS. 11A to 11E.

Figure 11A:
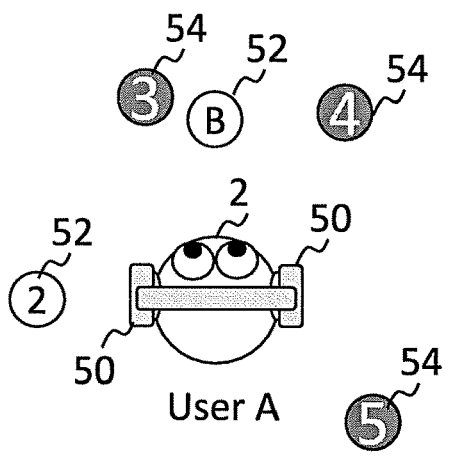

FIG. 11A illustrates an example of a pass-through mode 30 for the first user 2 with respect to the real exterior sound sources 52 of the first user (see FIG. 7A). This is real pass-through. This informs the first user 2 that the second user 4 has lost focus but does not inform the first user 2 of what the second user 4 is now focused on.

Figure 11B:
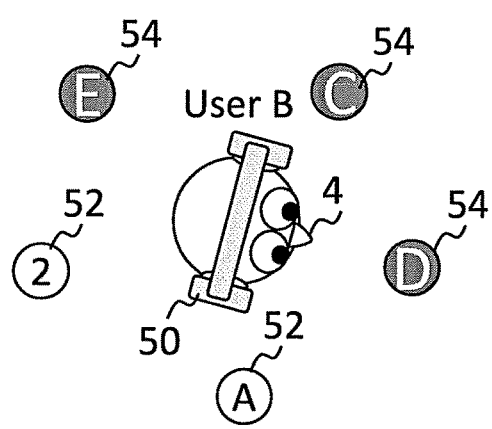

FIG. 11B illustrates an example of a pass-through mode 30 for the second user 4 with respect to the real exterior sound sources 52 of the second user (see FIG. 7B). The pass-through mode 30 is using head-tracking with real pass-through. This lets the second user change focus and hear an exterior sound source 54 (D).

Figure 11C:
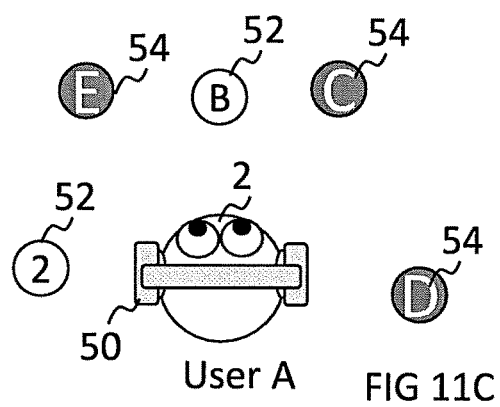

FIG. 11C illustrates an example of pass-through mode 30 for the first user 2 with respect to the exterior sound sources 54 of the second user 4. This is virtual pass-through. This informs the first user 2, that the second user 4 has lost focus and as the first user 2 can see an image of the second user 4 inform the first user 2 of what the second user 4 is focused on (D).

Figure 11D:
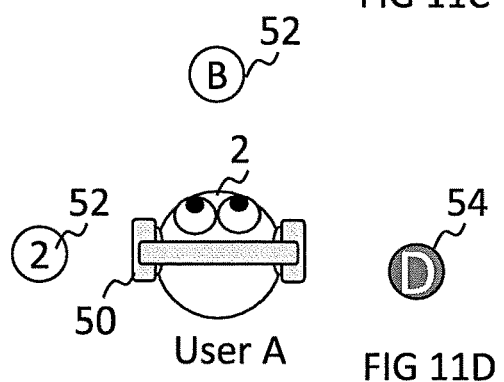

FIG. 11D illustrates an example of pass-through mode 30 for the first user 2 with respect to only the exterior sound sources 54 that the second user is focusing on (D). This is selective virtual pass-through. This informs the first user 2, that the second user has lost focus and informs the first user 2 of what the second user 4 is focused on (D).

Figure 11E:
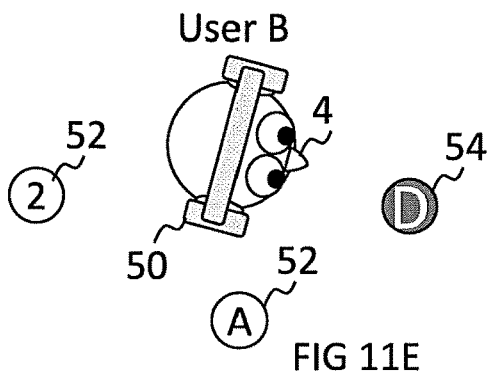

FIG. 11E illustrates an example of pass-through mode 30 for the second user 4 with respect to only the exterior sound source 54 that the second user is focusing on (D). This is selective real pass-through with head-tracking. This lets the second user 4 change focus and hear an exterior sound source 54 (D).

FIG. 12A illustrates a first arrangement of real exterior sound sources 54 for a first user 2 and FIG. 12B a second arrangement of real exterior sound sources 54 for a second user 4. As the users 2, 4 are remote, the real exterior sound sources 54 are different for the two users 2, 4.

In FIGS. 13A and 13B, the first user 2 and the second user share a common virtual environment of the conversational service 20, focusing on the same visual content 70, for example a common visual object.

In this example sound source for the voice audio of the second user 4 is rendered to the first user 2 and a sound source for the voice audio of the first user 2 is rendered to the second user 4.

As the first user 2 and the second user 4 share a common virtual environment, and are focusing on the same visual content 70, they also share the same spatial audio content illustrated using sound sources 52.

The sound sources 52 are rendered with the same spatial arrangement to the first user 2 (FIG. 14A) and the second user 4 (FIG. 14B). The first user 2 (FIG. 14A) and the second user 4 (FIG. 14B) share the same spatial audio scene in addition to sharing the same visual content 70.

The first and second users 2, 4 are focusing at a common point of interest (visual content 70), and this has caused a switch into active noise cancellation mode 40 (FIG. 14A, 14B).

In FIGS. 15A and 15B, the first user 2 and the second user 4 no longer share a common virtual environment of the conversational service 20, and no longer focus on the same common point of interest (the visual content 70), for example a common visual object. As the first user 2 and the second user 4 no longer share a common virtual environment, and do not focus on the same visual content 70, they do not share the same spatial audio content, that is the same arrangement of sound sources 52 relative to the user 2, 4.

FIG. 16A illustrates an example of pass-through mode 30 for the first user 2 with respect to the real exterior sound sources 54 of the first user (see FIG. 12A). This is real pass-through. This informs the first user 2, that the second user 4 has lost focus but does not inform the first user 2 of what the second user 4 is focused on.

FIG. 16B illustrates an example of pass-through mode 30 for the second user 4 with respect to the real exterior sound sources 54 of the second user (see FIG. 12B). The pass-through mode 30 is using head-tracking with real pass-through. This lets the second user 4 change focus and hear an exterior sound source 54 (C).

FIG. 16C illustrates an example of pass-through mode 30 for the first user 2 with respect to a selected exterior sound source 54. The exterior sound source 54 is selected to indicate to the first user 2 where the second user 4 is looking. The exterior sound source 54 can be a real exterior sound source 54 of the first user 2 that is closest to the desired direction or can be a virtual sound source that represents the exterior sound source 54 of the second user 4 that is associated with the direction in which the second user 4 is looking.

Figure 17A:
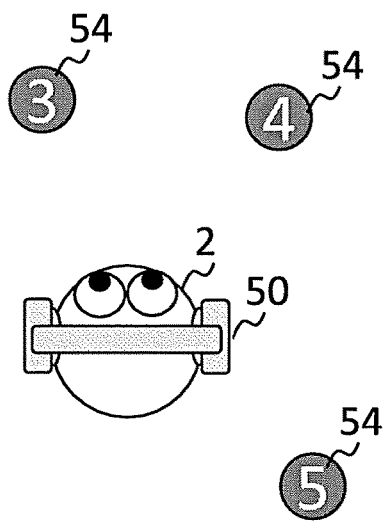
Figure 17B:
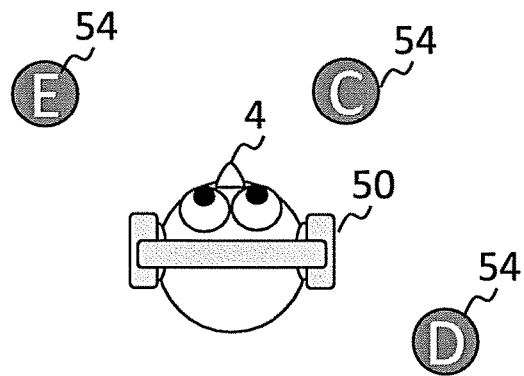

FIG. 17A illustrates a first arrangement of real exterior sound sources 54 for a first user 2 and FIG. 17B a second arrangement of real exterior sound sources 54 for a second user 4. As the users 2, 4 are remote, the real exterior sound sources 54 are different for the two users 2, 4.

Figure 18:
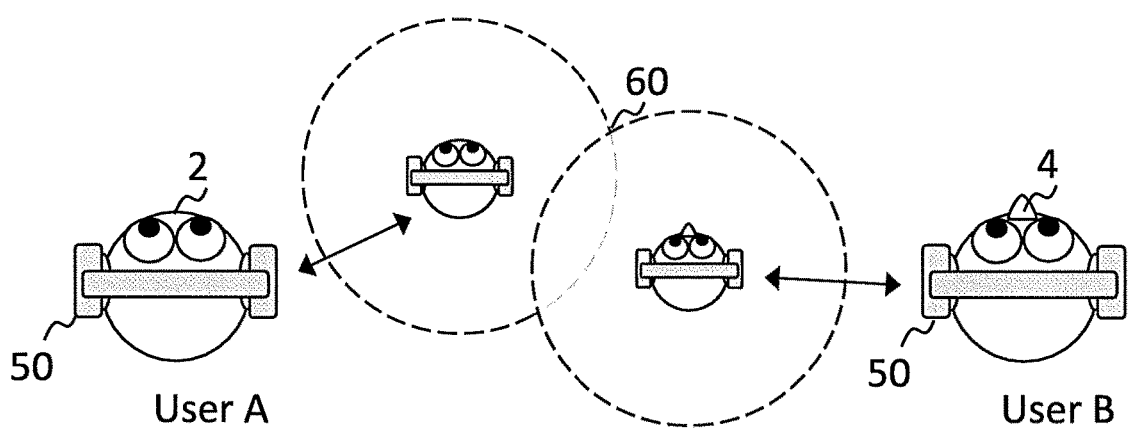

In FIG. 18, the first user 2 and the second user 4 share a common virtual environment 60 for a conversational service 20. In a virtual environment, the visual content 70 (if any) and the sound sources 52 rendered to a user are dependent on a virtual point of view of a virtual user in the virtual space which changes with the real point of view of the user in real space. In FIG. 18, the first user 2 and the second user 4 share a common virtual environment 60 and have the same (or nearly the same) virtual point of view. They are therefore experiencing the same visual scene and also the same audio scene represented by sound sources 52.

Figure 19A:
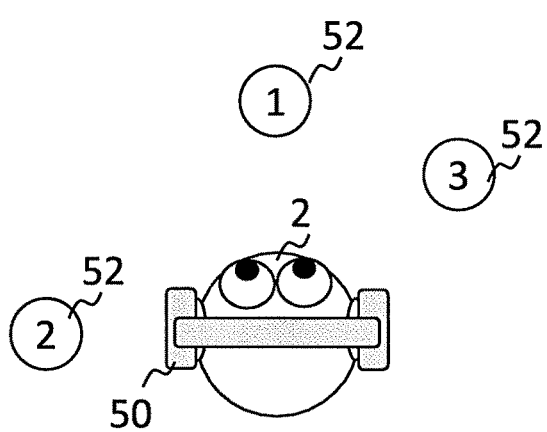
Figure 19B:
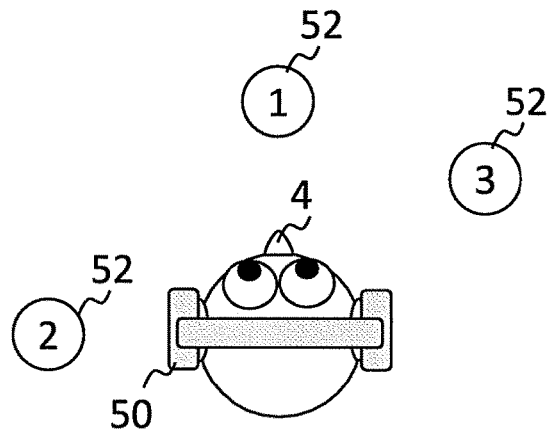

The sound sources 52 are rendered with the same spatial arrangement to the first user 2 (FIG. 19A) and the second user 4 (FIG. 19B). The first user 2 (FIG. 19A) and the second user 4 (FIG. 19B) share the same spatial audio scene.

The first and second users 2, 4 are focusing at a common point of interest e.g., the sound source (1) and this has caused a switch into active noise cancellation mode 40 (FIG. 19A, 19B).

In some examples, it can be determined that the users 2, 4 share a common point of interest from information about users' points of view which can, in some examples be determined based on location and/or orientation of the respective headsets 50 of the users 2, 4. The respective points of view depend on relative (position and) orientation of the users 2, 4. A change in relative position/orientation of the users 2, 4 can be used to indicate that the users 2,4 are no longer focusing on a common point of interest 72 and this can be used to trigger an exit from the active noise cancellation mode 40 into a pass-through mode 30.

FIG. 20 illustrates the virtual environment 60 of the conversational service 20, when the second user 4 has a change in a relative position/orientation, so that the second user 4 is no longer focusing on the previous common point of interest.

In the virtual environment 60, the first user 2 can move relative to the sound source of second user 4 and the other sound source(s) 52 and the audio rendered to the first user 2 and the second user 4 can be controlled accordingly; the second user 4 can move relative to the sound source of first user 2 and the other sound source(s) 52 and the audio rendered to the first user 2 and the second user 4 can be controlled accordingly; the common sound source(s) can move relative to the first user 2 and the second user 4 and the audio rendered to the first user 2 and the second user 4 can be controlled accordingly.

In this example, only the second user 4 changes their point of view by changing orientation. Consequently, the positions of the sound sources 52 remain constant in FIGS. 21A to 21C.

FIG. 21A illustrates an example of a pass-through mode 30 for the first user 2 with respect to the real exterior sound sources 52 of the first user (see FIG. 17A). This is real pass-through. This informs the first user 2 that the second user 4 has lost focus but does not inform the first user 2 of what the second user is now focused on.

FIG. 21B illustrates an example of a pass-through mode 30 for the second user 4 with respect to the real exterior sound sources 52 of the second user (see FIG. 17B). The pass-through mode 30 is using head-tracking with real pass-through. This lets the second user change focus and hear an exterior sound source 54 (C).

FIG. 21C illustrates an example of pass-through mode 30 for the first user 2 with respect to a selected exterior sound source 54. The exterior sound source 54 is selected to indicate to the first user 2 where the second user 4 is looking. The exterior sound source 54 can be a real exterior sound source 54 of the first user 2 that is closest to the desired direction or can be a virtual sound source that represents the exterior sound source 54 of the second user 4 that is associated with the direction in which the second user 4 is looking.

In the previous examples, FIGS. 9A, 9B provide an example of options for synchronized active noise cancellation and FIGS. 11A-11E provide examples of options for synchronized pass-through. FIGS. 14A, 14B provide an example of options for synchronized active noise cancellation and FIGS. 16A-16C provide examples of options for synchronized pass-through. FIGS. 19A, 19B provide an example of options for synchronized active noise cancellation and FIGS. 21A-21C provide examples of options for synchronized pass-through. There can be a synchronized switch from active noise cancellation mode 40 to pass-through mode 30 when there is no longer a common point of interest. There can be a synchronized switch from pass-through mode 30 to active noise cancellation mode 40 when there is a common point of interest.

It will be appreciated from the foregoing that the apparatus (e.g. first apparatus 12) can be configured to cause a switch from not using an active noise cancellation mode 40 for the conversational service 20 to using an active noise cancellation mode 40 for the conversational service 20 at the apparatus and at the remote apparatus (e.g. second apparatus 14) when there is a change from the first user 2 looking at a first object and the second user 4 not looking at the first object to the first user 2 looking at the first object and the second user 4 looking at the first object or there is a change from the first user 2 not looking at a first object and the second user 4 looking at the first object to the first user 2 looking at the first object and the second user 4 looking at the first object.

Various modifications can be made to the preceding examples. For example, temporal smoothing can be used to delay triggering a switch between modes 30, 40. For example, a loss of a common point of interest must occur for a minimum threshold time before triggering a switch from the active noise cancellation mode 40. A user can therefore have a quick glance elsewhere without triggering a change in the operation and indicating to another user that they would not be concentrating on the same thing.

In some cases, a user is forced to use active noise cancellation because they are in a highly noisy environment. In such case, the user can opt out of the above-described behavior. However, the behavior can still be allowed for the other user.

A headset 50 can be for example headphones, glasses, ear buds, ear phones, a head-mounted display etc.

FIG. 22 illustrates an example of a controller 200 suitable for use in the first apparatus 12 or in the second apparatus 14. Implementation of a controller 200 may be as controller circuitry. The controller 200 may be implemented in hardware alone, have certain aspects in software including firmware alone or can be a combination of hardware and software (including firmware).

As illustrated in FIG. 22 the controller 200 may be implemented using instructions that enable hardware functionality, for example, by using executable instructions of a computer program 206 in a general-purpose or special-purpose processor 202 that may be stored on a computer readable storage medium (disk, memory etc) to be executed by such a processor 202.

The processor 202 is configured to read from and write to the memory 204. The processor 202 may also comprise an output interface via which data and/or commands are output by the processor 202 and an input interface via which data and/or commands are input to the processor 202.

The memory 204 stores a computer program 206 comprising computer program instructions (computer program code) that controls the operation of the apparatus 12, 14 when loaded into the processor 202. The computer program instructions, of the computer program 206, provide the logic and routines that enables the apparatus to perform the methods illustrated. The processor 202 by reading the memory 204 is able to load and execute the computer program 206.

The apparatus 12, 14 therefore comprises:

at least one processor 202; and at least one memory 204 including computer program code the at least one memory 204 and the computer program code configured to, with the at least one processor 202, cause the apparatus 12, 14 at least to perform:

enabling a conversational service between a first user of the apparatus and a second user of a remote apparatus wherein the conversational service is a duplex service comprising simultaneous voice communication from the first user to the second user and voice communication from the second user to the first user; and enabling synchronization of a switch to using an active noise cancellation mode at the apparatus for the conversational service and at the remote apparatus for the conversational service, wherein the switch to using the noise cancellation mode is synchronized between the first and second users.

As illustrated in FIG. 23, the computer program 206 may arrive at the apparatus 12, 14 via any suitable delivery mechanism 208. The delivery mechanism 208 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 206. The delivery mechanism may be a signal configured to reliably transfer the computer program 206. The apparatus 12, 14 may propagate or transmit the computer program 206 as a computer data signal.

Computer program instructions for causing an apparatus to perform at least the following or for performing at least the following:

enabling a conversational service between a first user of the apparatus and a second user of a remote apparatus wherein the conversational service is a duplex service comprising simultaneous voice communication from the first user to the second user and voice communication from the second user to the first user; and enabling synchronization of a switch to using an active noise cancellation mode at the apparatus for the conversational service and at the remote apparatus for the conversational service, wherein the switch to using the noise cancellation mode is synchronized between the first and second users.

The computer program instructions may be comprised in a computer program, a non-transitory computer readable medium, a computer program product, a machine readable medium. In some but not necessarily all examples, the computer program instructions may be distributed over more than one computer program.

Although the memory 204 is illustrated as a single component/circuitry it may be implemented as one or more separate components/circuitry some or all of which may be integrated/removable and/or may provide permanent/semi-permanent/dynamic/cached storage.

Although the processor 202 is illustrated as a single component/circuitry it may be implemented as one or more separate components/circuitry some or all of which may be integrated/removable. The processor 202 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the Figs may represent steps in a method and/or sections of code in the computer program 206. The illustration of a particular order to the blocks does not necessarily imply that there is a required or preferred order for the blocks and the order and arrangement of the block may be varied. Furthermore, it may be possible for some blocks to be omitted.

As used here 'module' refers to a unit or apparatus that excludes certain parts/components that would be added by an end manufacturer or a user.

The above-described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one memory storing instructions that, when executed with the at least one processor, cause the apparatus to:
      enable a conversational service between a first user of the apparatus and a second user of a remote apparatus, wherein the conversational service is a duplex service comprising simultaneous voice communication from the first user to the second user and voice communication from the second user to the first user; and
      enable synchronization of a switch to using an active noise cancellation mode at the apparatus and at the remote apparatus, wherein the switch to using the active noise cancellation mode is synchronized between the first and second users,
   wherein the instructions, when executed with the at least one processor, cause the apparatus to enable synchronization of the switch between using a pass-through mode to using the active noise cancellation mode at the apparatus and at the remote apparatus, and
   wherein the switch between using the pass-through mode to using the active noise cancellation mode is synchronized between the first and second users.

2. An apparatus as claimed in claim 1 wherein the conversational service is a phone call, a teleconference, a videoconference, a shared multimedia experience, a shared gaming experience or a shared virtual reality experience.

3. An apparatus as claimed in claim 1, configured such that exterior local sound to the first user that is cancelled for the first user in the active noise cancellation mode is not cancelled for the first user in the pass-through mode.

4. An apparatus as claimed in claim 1, wherein in the pass-through mode, pass-through sound rendered to the first user depends on a point of view of the first user.

5. An apparatus as claimed in claim 1, configured such that the exterior local sound to the second user that is cancelled or is not provided for the first user in the active noise cancellation mode is not cancelled or is provided for the first user in the pass-through mode.

6. An apparatus as claimed in claim 1, wherein in the pass-through mode, pass-through sound rendered to the first user depends on a point of view of the second user.

7. An apparatus as claimed in claim 1, wherein the instructions, when executed with the at least one processor, cause the apparatus to a switch to using the active noise cancellation mode at the apparatus and at the remote apparatus when the first user and the second user are focusing at a common point of interest.

8. An apparatus as claimed in claim 1, wherein the instructions, when executed with the at least one processor, cause the apparatus to switch to using the active noise cancellation mode at the apparatus and at the remote apparatus in dependence upon information about what visual content each of the first user and the second user is looking at.

9. An apparatus as claimed in claim 1, wherein the instructions, when executed with the at least one processor, cause the apparatus to increase a level of active noise cancellation at the apparatus and at the remote apparatus while a focus of a gaze of the first user and a focus of a gaze of the second user are converging and to decrease a level of active noise cancellation at the apparatus and at the remote apparatus while a focus of a gaze of the first user and a focus of a gaze of the second user are diverging.

10. An apparatus as claimed in claim 1, wherein the instructions, when executed with the at least one processor, cause the apparatus to switch from not using an active noise cancellation mode for the cancellation service to using an active noise cancellation mode at the apparatus and at the remote apparatus when:
   there is a change from the first user looking at a first object and the second user not looking at the first object to the first user looking at the first object and the second user looking at the first object, or
   there is a change from the first user not looking at a first object and the second user looking at the first object to the first user looking at the first object and the second user looking at the first object.

11. An apparatus as claimed in claim 1, wherein the instructions, when executed with the at least one processor, cause the apparatus to enable synchronization of a switch from using the active noise cancellation mode at the apparatus and at the remote apparatus, wherein the switch from using the noise cancellation mode is synchronized between the first and second users.

12. An apparatus as claimed in claim 1, configured as a headset.

13. A non-transitory program storage device readable by an apparatus, tangibly embodying a computer program that, when run on one or more processors, causes:
   enabling a conversational service between a first user of the apparatus and a second user of a remote apparatus wherein the conversational service is a duplex service comprising simultaneous voice communication from the first user to the second user and voice communication from the second user to the first user; and
   enabling synchronization of a switch to using an active noise cancellation mode at the apparatus and at the remote apparatus, wherein the switch to using the noise cancellation mode is synchronized between the first and second users,
   wherein the instructions, when executed with the at least one processor, cause the apparatus to enable synchronization of the switch between using a pass-through mode to using the active noise cancellation mode at the apparatus and at the remote apparatus, and
   wherein the switch between using the pass-through mode to using the active noise cancellation mode is synchronized between the first and second users.

14. A method comprising:
   enabling a conversational service between a first user of the apparatus and a second user of a remote apparatus wherein the conversational service is a duplex service comprising simultaneous voice communication from the first user to the second user and voice communication from the second user to the first user; and
   enabling synchronization of a switch to using an active noise cancellation mode at the apparatus and at the remote apparatus, wherein the switch to using the noise cancellation mode is synchronized between the first and second users,
   wherein the instructions, when executed with the at least one processor, cause the apparatus to enable synchronization of the switch between using a pass-through mode to using the active noise cancellation mode at the apparatus and at the remote apparatus, and
   wherein the switch between using the pass-through mode to using the active noise cancellation mode is synchronized between the first and second users.

* * * * *